(12) United States Patent
De La Taille

(10) Patent No.: US 9,933,302 B2
(45) Date of Patent: Apr. 3, 2018

(54) ELECTRONIC CIRCUIT COMPRISING A CURRENT CONVEYOR ARRANGED WITH AN ANTI-SATURATION DEVICE AND CORRESPONDING DEVICE FOR DETECTING PHOTONS

(71) Applicant: CNRS—Centre National De La Recherche Scientifique, Paris (FR)

(72) Inventor: Christophe De La Taille, Le Chesnay (FR)

(73) Assignee: CNRS-CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 448 days.

(21) Appl. No.: 14/421,711

(22) PCT Filed: Aug. 13, 2013

(86) PCT No.: PCT/EP2013/066937
§ 371 (c)(1),
(2) Date: Feb. 13, 2015

(87) PCT Pub. No.: WO2014/027001
PCT Pub. Date: Feb. 20, 2014

(65) Prior Publication Data
US 2015/0204719 A1    Jul. 23, 2015

(30) Foreign Application Priority Data

Aug. 14, 2012  (FR) ..................... 12 57813

(51) Int. Cl.
*G01J 1/44* (2006.01)
*G01T 1/17* (2006.01)

(52) U.S. Cl.
CPC ............ *G01J 1/44* (2013.01); *G01T 1/17* (2013.01); *G01J 2001/444* (2013.01)

(58) Field of Classification Search
CPC .. G01J 1/44; G01J 2001/442; G01J 2001/444; G01T 1/17; H03F 3/08
See application file for complete search history.

(56) References Cited

U.S. PATENT DOCUMENTS 3,806,823 A * 4/1974 Marek ................. H03F 1/3211
                                                         330/261
4,914,402 A * 4/1990 Dermitzakis ............ H03G 7/06
                                                         330/308

(Continued)

OTHER PUBLICATIONS

Z. Ajaltouni and al, "The Tilecal 3-in-1 PMT Base concept and the PMT block assembly" Last modified: Dec. 15, 1996, http://atlas.web.cem.ch/Atlas/SUB_DETECTORS/TILE/TDR/html/TDR-1.html.

Michal et al., "Single Active Element PID Controllers", Radioelektronika (Radioelektronika), 2010, 20th International Conference, IEEE, Piscataway, NJ, USA, Apr. 19, 2010, pp. 1-4, XP031685273.

(Continued)

*Primary Examiner* — Que T Le
*Assistant Examiner* — Jennifer Bennett
(74) *Attorney, Agent, or Firm* — David D. Brush; Westman, Champlin & Koehler, P.A.

(57) ABSTRACT

An electronic circuit including a current conveyor connected to a load is provided. The load delivers at least one first voltage output and one second voltage output. Such a circuit is noteworthy in that the second voltage output has what is called a non-linear behavior relative to the magnitude of the input current of the electronic circuit in a given range.

15 Claims, 3 Drawing Sheets

(56) References Cited

U.S. PATENT DOCUMENTS

Figure 1:
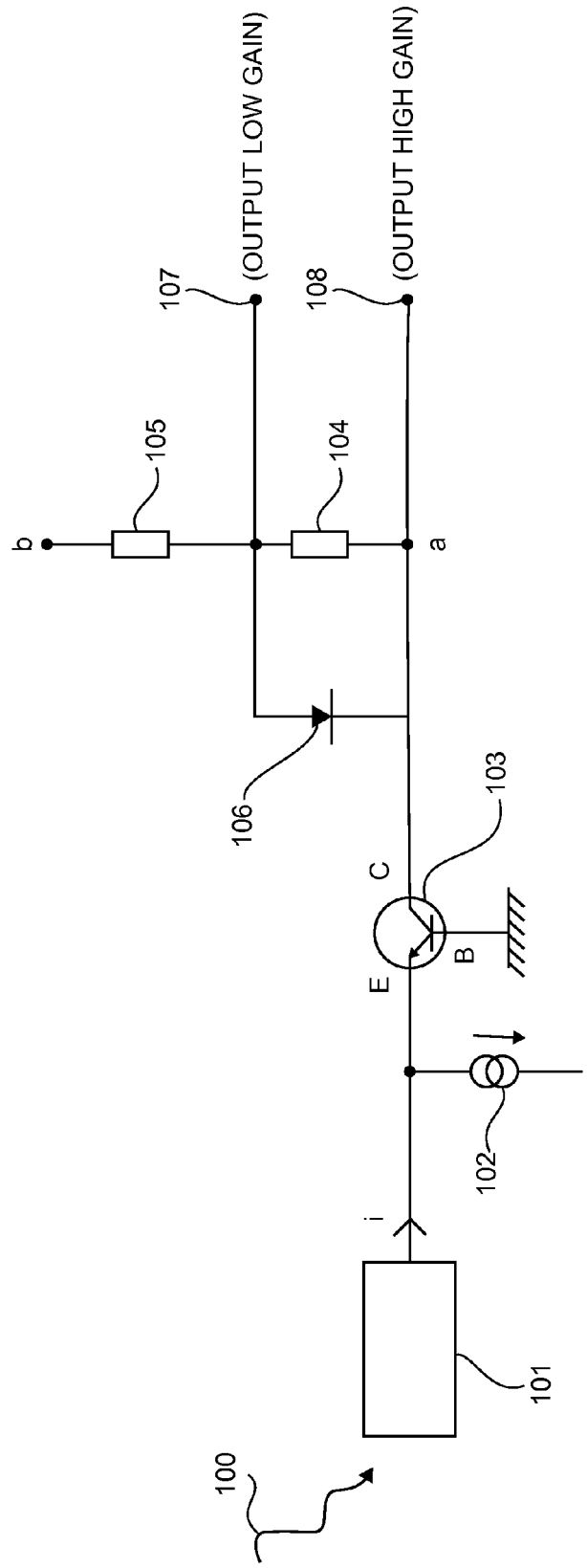

| 6,504,736 B1* | 1/2003 | Ono | G05F 3/30 |
| | | | 323/315 |
| 7,825,735 B1* | 11/2010 | Wessendorf | H03F 3/08 |
| | | | 330/103 |
| 2005/0218994 A1 | 10/2005 | Guckenberger et al. | |

OTHER PUBLICATIONS

N. Pillet et al., "FATALIC, a Wide Dynamic Range Integrated Cir-cuit for the tilecal VFE Atlas Upgrade", Topical Workshop on Electronic for Particle Physics, Sep. 30, 2011, XP055064748.

Lucotte et al., "A Front-End Read Out Chip for the OPERA Scintillator Tracker" Nuclear Instruments & Methods in Physics Research. Section A: Accelerators, Spectrometers, Detectors, and Associated Equipment, Elsevier BV, North Holland, Netherlands, vol. 521, No. 2-3, Apr. 1, 2004, pp. 378-392, XP004498317.

Corsi et al., "Front-End Electronics for Silicon Photo-Multipliers Couples to Fsat Scintillators" Nuclear Science Symposium Conference Record (NSS/MIC), 2010 IEEE, IEEE, Oct. 30, 2010, pp. 1332-1339, XP032054261.

English translation of the Written Opinion dated Feb. 14, 2015 for corresponding International Patent Application No. PCT/EP2013/066937, filed Aug. 13, 2013.

International Search Report dated Nov. 11, 2013 for corresponding International Patent Application No. PCT/EP2013/066937, filed Aug. 13, 2013.

* cited by examiner

ELECTRONIC CIRCUIT COMPRISING A CURRENT CONVEYOR ARRANGED WITH AN ANTI-SATURATION DEVICE AND CORRESPONDING DEVICE FOR DETECTING PHOTONS

1. CROSS-REFERENCE TO RELATED APPLICATION

This Application is a Section 371 National Stage Application of International Application No. PCT/EP2013/066937, filed Aug. 13, 2013, the content of which is incorporated herein by reference in its entirety, and published as WO 2014/027001 on Feb. 20, 2014, not in English.

2. FIELD OF THE INVENTION

The field of the invention is that of microelectronics and optoelectronics.

More specifically, the invention pertains to a technique concerning the current conveyors used in numerous devices capable of detecting physical parameters related to the photons received.

The invention has numerous applications, for example in the medical field (and more particularly in devices used to carry out positron emission tomography (PET) as well as in fields using photomultipliers or comparable devices.

3. TECHNOLOGICAL BACKGROUND

We shall strive especially here below in this document to describe the problems and issues existing in the field of photomultipliers, which the inventors of the present patent application have faced. The invention is of course not limited to this particular field of application but is of interest in any current amplifying technique that has to cope with proximate or similar problems and issues.

A photomultiplier traditionally comprises a photocathode. When an incident photon comes into contact with this photocathode, it releases an electron under photoelectric effect. Such an electron is then directed towards a succession of dynodes in order to be multiplied (through an avalanche effect) so that measurements can be made at the output of the photomultiplier.

More specifically, it is important to be able both to determine the precise instant at which a photon reaches the photocathode (and therefore potentially to put the incident photons in temporal order) and to quantify with precision the energy conveyed by the incident photons.

Indeed, the greater the ability to determine the instant of arrival of a photon with precision, the greater is the ability to determine whether two photons have arrived simultaneously. This criterion is crucial, especially in the medical field where it is sought to identify the annihilation of a positron via the detection of two simultaneously emitted photons that leave a patient, through the use of at least two photomultipliers positioned opposite each other (two photons that arrive at photocathode photomultipliers in such a configuration, with a time lag of the order of one picosecond, are reported as being detected simultaneously).

The quantification of the energy received by a photomultiplier for its part has an impact on the quality of the tomography shots obtained through a PET device. The more precise the quantification, the higher is the quality of the tomography shots obtained. The dynamic range characterizes the ratio of the maximum signal to the minimum signal (often the electronic noise or the single photon) and this ratio is a few thousands.

In the PET field, a search is currently being made for temporal precision levels of some tens of picoseconds ($10^{-12}$ s) for an activation threshold of some photoelectrons and dynamic ranges of some thousands of photoelectrons. This temporal precision requires bandwidths of the order of one GHz and an amplification of the weakest signals by a factor of about 10 (20 dB). These high bandwidths are now possible at reasonable power levels through advances made in integrated circuits (ASICs), especially in silicon-germanium BiCMOS technology and through advances made with solid-state "silicon photomultipliers") or MPPC (<<Multi-Pixel Photon Counters>>) which have sufficiently good intrinsic resolutions and limit parasitic inductances. However, their high capacitance (some hundreds of pF) necessitate low input impedance amplifiers, whence the use of current conveyors which enable this characteristic to be obtained.

One difficulty encountered with current conveyors however is that of obtaining high amplification while at the same time appropriately processing the strongest signals which tend to saturate the amplifier and therefore falsify the measurement of amplitude.

There are different types of known techniques in the prior art, enabling these two problems to be resolved simultaneously.

A first technique is described in A. Lucotte and al, "*A front-end read-out chip for the OPERA scintillator tracker*" in "*Nuclear instruments & methods in physics research. Section A, Accelerators, spectrometers, detectors and associated equipment*", 2004. This article presents a specialized integrated circuit or application-specific integrated circuit (ASIC) positioned at the output of a photomultiplier. Such a circuit has a current preamplifier and gain correction unit comprising transistors and current mirror circuits (aimed at making current copies for separate use), enabling an input current to be amplified by a large factor. More specifically, the current preamplifier and gain correction unit provides two outputs, one output known as a low-gain output and one output known as a high-gain output that respectively that supply a channel called a fast-shaper channel used to obtain temporal information on the incident photons and a channel called a slow-shaper channel that measures the charge of the photon or photons detected by the photomultiplier.

However, one drawback of this first technique is that the "high gain" mirror arm which gets saturated causes distortion in the "low gain" arm and therefore gives an imperfect copy of the current coming from the detector. In addition, these mirrors add parasitic capacitances which, at low power, reduce the bandwidth. Finally, the current copies increase the consumption of the circuit.

A second technique, used in the scintillating tile calorimeter (Tilecal) of the ATLAS detector within the LHC, and described in Z. Ajaltouni and al, "*The Tilecal 3-in-1 PMT Base concept and the PMT block assembly*", consists in amplifying not an output current from the photomultiplier, but a voltage (by means of a voltage preamplifier) in having converted the current of the detector in a passive resistor (with a value of generally 50 ohm) The behavior under saturation is then excellent and it is easy to simultaneously deal with both charge and time measuring stages but the signal-to-noise ratio for the weak signals is less good because the 50-ohm resistor dominates the electronic noise. It is then necessary to use a very-low-noise amplifier which typically consumes tens of mW.

4. SUMMARY OF THE INVENTION

In one particular embodiment of the invention, an electronic circuit is proposed comprising a current conveyor connected to a load, said load providing at least one first voltage output and at least one second voltage output. Such a circuit is remarkable in that said second voltage output has a behavior called a non-linear behavior relative to the intensity of the input current of said electronic circuit on a given range.

Thus, even when the intensity of the current is high, the circuit is not saturated and makes it possible, through its behavior, to make precise measurements via said first and second voltage outputs.

In particular, when the intensity of the input current is correlated with the photons received via a photomultiplier device, it is possible to make precise measurements, whatever the intensity of the input current, on data pertaining to the time of arrival of the photons, as well as the level of energy received.

According to one particular aspect of the invention, for an electronic circuit of this kind, said first voltage output of said load is proportional to the intensity of the input current on the entire dynamic range of said input current (low-gain output) and said second voltage output of said load is proportional to the intensity of input current on a fraction of said dynamic range (high-gain output).

According to one particular aspect of the invention, said load comprises at least two resistors of distinct values, and an anti-saturation device parallel-mounted with the resistor possessing the greatest value.

Thus, such a circuit has a simple architecture that enables the current conveyor not to get saturated and therefore to provide an output current that is always identical to the input current, even for the strongest signals, ensuring the precision of the measurement of charge. It averts the use of current mirror circuits making copies of current that are not necessarily identical and having greater electronic noise. In addition such a circuit, by its simplicity (few components are needed to make the circuit) enables measurements of interest (with regard to the time of arrival of the photons and received energy levels) to be made more rapidly than with the prior-art techniques with a bandwidth greater than one GHz.

According to one particular aspect of the invention, the ratio between said greatest value and a value of the other resistor is at least equal to 5.

According to one particular aspect of the invention, said ratio is a real number included in the interval [10; 20]. This ratio provides for maximum amplification for the small signals corresponding to the first photons received and therefore makes it easier to distinguish these signals, thus optimizing the temporal precision.

According to one particular aspect of the invention, such an electronic circuit comprises a first resistor having a value of 100 ohms, and a second resistor having a value of 1000 ohms. These values make it possible, in integrated technology, to minimize the parasitic capacitances while at the same time providing high amplification. Such a circuit makes it possible to attain a bandwidth greater than one GHz.

According to one particular aspect of the invention, said anti-saturation device is a diode. This non-linear device has very high (logarithmic) compression on a very great dynamic range while at the same time minimizing the parasitic capacitance which limits the bandwidth, which is essential to the precise measurement of time (<10 ps)

According to one particular aspect of the invention, said anti-saturation device comprises at least one diode-mounted transistor.

According to one particular aspect of the invention, said current conveyor comprises at least one transistor. According to one particular aspect of the invention, said transistor is a PNP or NPN type bipolar transistor.

According to one particular aspect of the invention, said transistor is mounted as a common-base transistor.

According to one particular aspect of the invention, said transistor is a P channel or N channel field-effect transistor.

According to one particular aspect of the invention, said transistor is mounted as a common-gate transistor.

According to one particular aspect of the invention, said current conveyor comprises a plurality of transistors.

According to one particular aspect of the invention, such a circuit comprises a negative feedback control circuit.

Another embodiment of the invention proposes a device for detecting photons comprising an electronic circuit as mentioned here above.

5. LIST OF FIGURES

Figure 2:
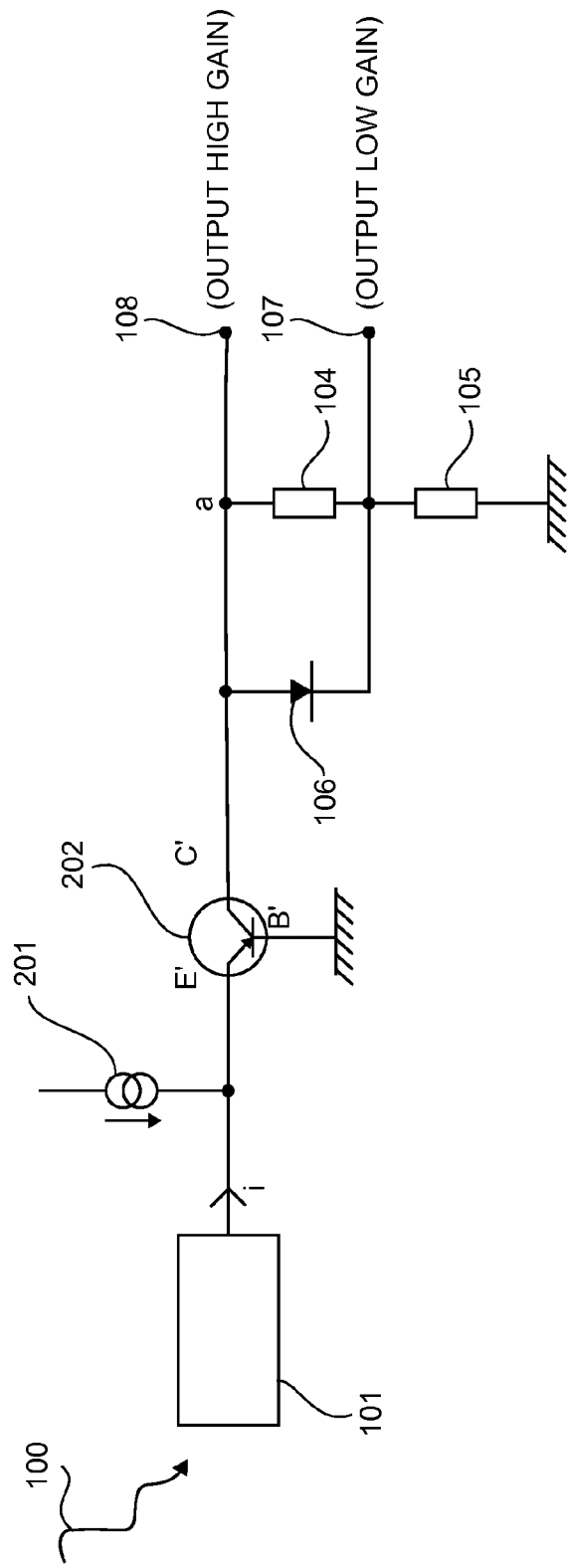
Figure 3:
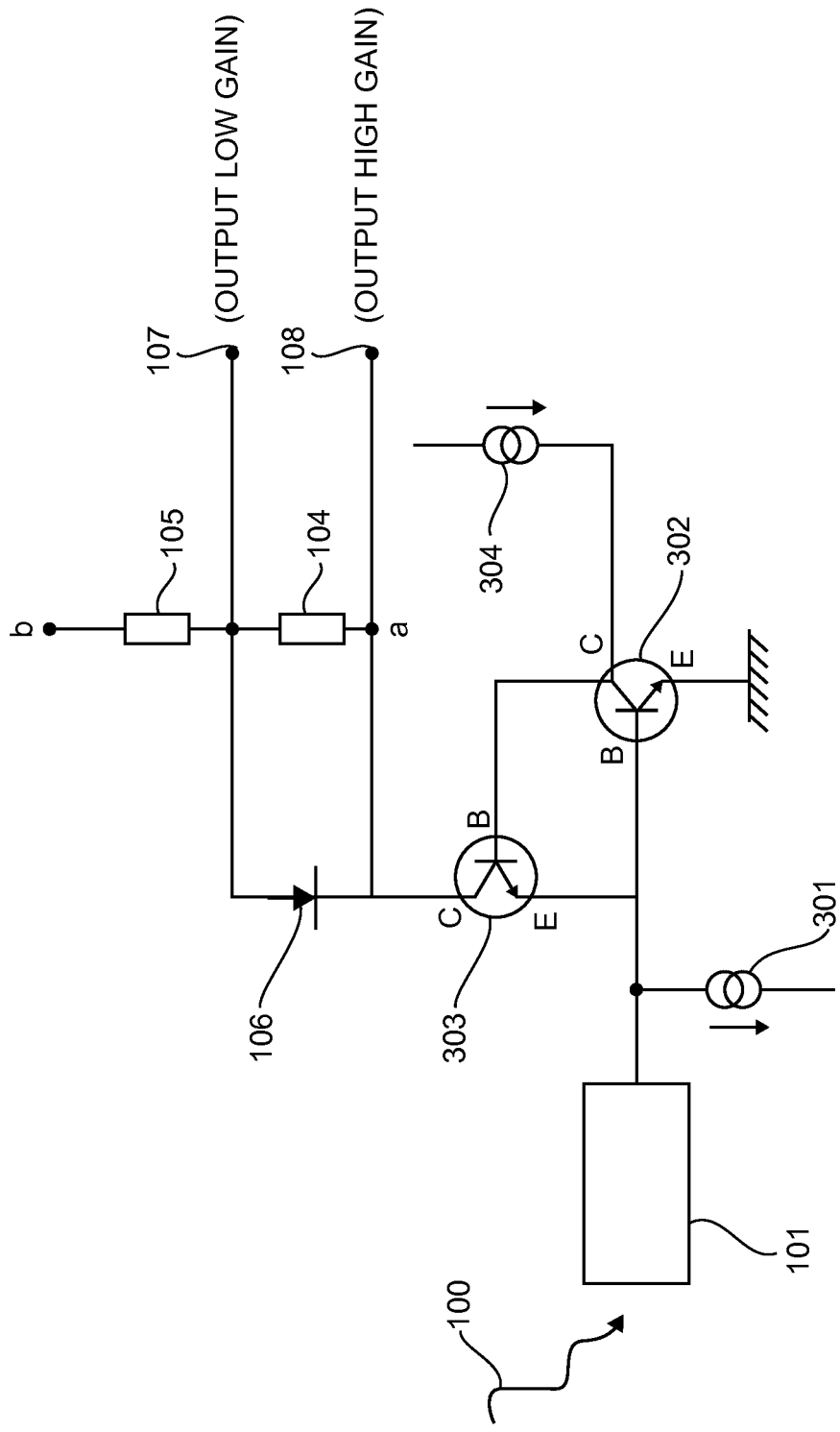

Other features and advantages of the invention shall appear from the following description, given by way of an indicative and non-exhaustive example and from the appended drawings, of which:

FIG. 1 presents an electronic circuit according to a first embodiment of the invention, in which a current conveyor comprises an NPN type bipolar transistor which can also be replaced by an NMOS transistor;

FIG. 2 presents an electronic circuit according to a second embodiment of the invention, in which a current conveyor comprises a PNP or PMOS type bipolar transistor;

FIG. 3 presents an electronic circuit according to a third embodiment of the invention, in which a current conveyor is made by a composite mounting of two "super common base" NPN transistors that can also be made with combinations of NPN, NMOS, PNP or PMOS transistors.

6. DETAILED DESCRIPTION

In all the figures of the present document, the identical elements and steps are designated by a same numerical reference.

FIG. 1 presents an electronic circuit according to a first embodiment of the invention, in which the current conveyor comprises an NPN type bipolar transistor.

When a photon is received 100 by a photomultiplier device photomultiplier 101, the current i induced by such a device is generally not intense enough to be capable of being measured by classic measurement devices. The circuit of FIG. 1 amplifies the received current while at the same time being capable of dealing with situations where a major flux of photons is received by the photomultiplier device 101.

Such a circuit has an NPN bipolar transistor 103 (i.e a current conveyor) mounted so that the base B is connected to a DC voltage source ("common base" mounting), the collector C is connected to an active load possessing the two terminals a and b, and the emitter E is connected to the output of the photomultiplier device 101 and a biasing device 102 (which is a current source).

According to this embodiment, such an active load comprises two resistors 104 and 105, the resistor 104 having a value greater than that of the resistor 105, and an anti-saturation device 106 parallel-mounted with the resistor 104.

The measurements obtained at the first output 107 make it possible to speedily and precisely determine the energy conveyed by the photons received by the photomultiplier device 101.

The measurements obtained at the second output 108 make it possible to determine the time of arrival of photons received by the photomultiplier device 101.

In another embodiment, the NPN type bipolar transistor is replaced by an NMOS transistor.

FIG. 2 presents an electronic circuit according to a second embodiment of the invention, in which a current conveyor comprises a PNP type bipolar transistor.

In this embodiment, the current conveyor correspond to a PNP type bipolar transistor mounted so that the base B' is connected to the ground, the collector C' is connected to an active load possessing the two terminals a and b, and the emitter E' is connected to the output of the photomultiplier device 101 and of a biasing device 201.

In another embodiment, the PNP type bipolar device is replaced by a PMOS transistor.

FIG. 3 presents an electronic circuit according to a third embodiment of the invention, in which a current conveyor is formed by a composite mounting of two "super common base" NPN transistors.

In this embodiment, the current conveyor corresponds to the combination of two NPN transistors 302, 303 mounted so that the emitter E of the NPN type bipolar transistor 302 is connected to the ground, the collector C of the NPN type bipolar transistor 302 is connected to the base of the NPN type bipolar transistor 303, and to a biasing device 304, and the base B of the NPN type bipolar transistor 302 is connected to the emitter E of the NPN type bipolar transistor 303, the output of the photomultiplier device 101, and to a biasing device 301.

In another embodiment, such a current conveyor can also be made with combinations of NPN, NMOS, PNP or PMOS transistors.

In a preferred embodiment of the invention, the resistor 104 has a value of 1000 ohms and the resistor 105 has a value of 100 ohms.

At least one embodiment of the disclosure provides a technique for amplifying a current that does not use current mirror circuits and can be used to obtain two output voltages, always directly derived from the current coming from the photodetector.

At least one embodiment provides a technique of this kind that makes it possible, at the same time, to obtain precise temporal information on the first incident photons as well as to obtain a precise measurement of the level of energy received, even at high levels of current.

At least one embodiment proposes a technique that uses only few electronic components and minimizes the dissipated power, making it possible to limit the heating of the photodetector situated in immediate proximity and highly sensitive to temperature.

In at least one embodiment the present technique makes the best possible use of the intrinsic performance values in terms of measurement of time and energy, by a signal conditioning circuit, of the different types of photodetectors (classic photomultipliers or silicon photomultipliers) mentioned here above.

Although the present disclosure has been described with reference to one or more examples, workers skilled in the art will recognize that changes may be made in form and detail without departing from the scope of the disclosure and/or the appended claims.

The invention claimed is:

1. An electronic circuit comprising:
    a current conveyor connected to a load, said load providing at least one first voltage output and at least one second voltage output, wherein said second voltage output has a behavior called a non-linear behavior relative to an intensity of an input current of said electronic circuit on a given range, and
    wherein said load comprises first and second resistors of distinct values, and an anti-saturation device directly parallel-mounted with the resistor of the first and second resistors possessing the greatest resistance value.

2. The electronic circuit according to claim 1, wherein said first voltage output of said load is proportional to the intensity of the input current on an entire dynamic range of said input current and wherein said second voltage output of said load is proportional to the intensity of the input current on a fraction of said dynamic range.

3. The electronic circuit according to claim 1, wherein a ratio between said greatest value and a value of the other of the first and second resistors is at least equal to 5.

4. The electronic circuit according to claim 3, wherein said ratio is a real number included in the interval [10; 20].

5. The electronic circuit according to claim 3, wherein the first resistor has a resistance value of 100 ohms and the second resistor has a value of 1000 ohms.

6. The electronic circuit according to claim 1, wherein said anti-saturation device is a diode.

7. The electronic circuit according to claim 1, wherein said anti-saturation device comprises at least one diode-mounted transistor.

8. The electronic circuit according to claim 1, wherein said current conveyor comprises at least one transistor.

9. The electronic circuit according to claim 8, wherein said transistor belongs to the group consisting of:
    PNP or NPN type bipolar transistors; and
    P channel or N channel field-effect transistors.

10. The electronic circuit according to claim 9, wherein when said transistor is a bipolar transistor, it is mounted as a common-base transistor, and when said transistor is a field-effect transistor, it is mounted as a common-gate transistor.

11. The electronic circuit according to claim 1, wherein said current conveyor comprises a plurality of transistors.

12. The electronic circuit according to claim 1, wherein the electronic circuit comprises a negative feedback control circuit.

13. The electronic circuit of claim 1, wherein the load comprises two resistors, which include the first and second resistors.

14. A device for detecting photons, comprising:
    an electronic circuit comprising a current conveyor connected to a load, said load providing at least one first voltage output and at least one second voltage output, wherein said second voltage output has a behavior called a non-linear behavior relative to an intensity of an input current of said electronic circuit on a given range, and
    wherein said load comprises first and second resistors of distinct values, and an anti-saturation device directly parallel-mounted with the resistor of the first and second resistors possessing the greatest resistance value.

15. The device of claim 14, wherein the load comprises two resistors, which include the first and second resistors.

* * * * *